(12) United States Patent
Suleiman et al.

(10) Patent No.: US 12,461,218 B2
(45) Date of Patent: Nov. 4, 2025

(54) METHOD FOR CLASSIFYING HEIGHTS OF OBJECTS BY MEANS OF ULTRASONIC SENSOR TECHNOLOGY

(71) Applicant: Continental Autonomous Mobility Germany GmbH, Ingolstadt (DE)

(72) Inventors: Wassim Suleiman, Kriftel (DE); Christopher Brown, Seligenstadt (DE); Ahmed Hamdy Gad, Frankfurt am Main (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 199 days.

(21) Appl. No.: 18/255,793

(22) PCT Filed: Nov. 16, 2021

(86) PCT No.: PCT/DE2021/200189
§ 371 (c)(1),
(2) Date: Jun. 2, 2023

(87) PCT Pub. No.: WO2022/117158
PCT Pub. Date: Jun. 9, 2022

(65) Prior Publication Data
US 2024/0061094 A1 Feb. 22, 2024

(30) Foreign Application Priority Data
Dec. 3, 2020 (DE) .................... 10 2020 215 255.1

(51) Int. Cl.
*G01S 7/539* (2006.01)
*G01S 15/42* (2006.01)
*G01S 15/931* (2020.01)

(52) U.S. Cl.
CPC .............. *G01S 7/539* (2013.01); *G01S 15/42* (2013.01); *G01S 15/931* (2013.01); *G01S 2015/932* (2013.01)

(58) Field of Classification Search
CPC ........ G01S 15/931; G01S 15/42; G01S 7/539; G01S 2015/932
See application file for complete search history.

(56) References Cited

U.S. PATENT DOCUMENTS 4,831,604 A * 5/1989 McKnight ............... G01S 15/10
376/258
6,205,710 B1 3/2001 Busse
(Continued)

FOREIGN PATENT DOCUMENTS

DE 19853344 A1 5/2000
DE 102005003970 A1 8/2006
(Continued)

OTHER PUBLICATIONS

Notice of Reasons for Refusal drafted on Nov. 22, 2023 for the counterpart Japanese Patent Application No. 2023-526113 and machine translation of same.
(Continued)

*Primary Examiner* — Daniel L Murphy
*Assistant Examiner* — Amie M Ndure (57) ABSTRACT

A method for classifying the height of an object by means of at least one ultrasonic sensor of a vehicle is disclosed. The method includes emitting an ultrasonic signal by the ultrasonic sensor of the vehicle in a transmission cycle; and performing a reception cycle, wherein the reception cycle has a reception time window which makes it possible to receive echoes having a transit time which corresponds to at least double a reception range of the ultrasonic sensor. It is checked whether echoes were received in the reception cycle. A detected object is classified in a height class
(Continued)

depending on whether at least a first and a second echo were received, wherein the transit time of the second echo is an integer multiple of the transit time of the first echo.

19 Claims, 3 Drawing Sheets

(56) References Cited

U.S. PATENT DOCUMENTS

| | | | | |
|---|---|---|---|---|
| 6,307,811 | B1* | 10/2001 | Luber | G01S 15/105 367/137 |
| 10,426,441 | B2* | 10/2019 | Sang | G01S 15/8963 |
| 11,002,851 | B2* | 5/2021 | Soldner | G01S 15/10 |
| 2001/0022756 | A1* | 9/2001 | Nagai | G01S 15/88 367/99 |
| 2008/0105331 | A1* | 5/2008 | You | B67D 1/0888 141/95 |
| 2015/0348414 | A1 | 12/2015 | Jung | |
| 2016/0077206 | A1* | 3/2016 | Dokmanic | G01S 3/74 367/7 |
| 2018/0012494 | A1 | 1/2018 | Walessa et al. | |
| 2018/0165956 | A1 | 6/2018 | Heimberger et al. | |
| 2022/0179067 | A1 | 6/2022 | Matthies et al. | |
| 2022/0244732 | A1* | 8/2022 | Suzuki | G05D 1/0212 |

FOREIGN PATENT DOCUMENTS

| | | |
|---|---|---|
| DE | 102015006931 A1 | 12/2015 |
| DE | 102015205244 B3 | 12/2015 |
| DE | 102016113736 A1 | 2/2018 |
| DE | 102017106743 A1 | 10/2018 |
| DE | 102018102786 A1 | 8/2019 |
| DE | 102018103414 A1 | 8/2019 |
| DE | 102019205565 A1 | 10/2020 |
| WO | 2018010024 A1 | 1/2018 |

OTHER PUBLICATIONS

German Search Report dated Jul. 27, 2021 for the counterpart German Patent Application No. 10 2020 215 255.1.

The International Search Report and the Written Opinion of the International Searching Authority mailed on Jul. 1, 2022 for the counterpart PCT Application No. PCT/DE2021/200189.

\* cited by examiner

METHOD FOR CLASSIFYING HEIGHTS OF OBJECTS BY MEANS OF ULTRASONIC SENSOR TECHNOLOGY

CROSS REFERENCE TO RELATED APPLICATIONS

The present application is a National Stage Application under 35 U.S.C. § 371 of International Patent Application No. PCT/DE2021/200189 filed on Nov. 16, 2021, and claims priority from German Patent Application No. 10 2020 215 255.1 filed on Dec. 3, 2020, in the German Patent and Trademark Office, the disclosures of which are herein incorporated by reference in their entireties.

FIELD OF INVENTION

The invention relates to a method for classifying the heights of objects in the region surrounding vehicles by means of ultrasonic sensor technology.

BACKGROUND

The process of capturing environmental information in the region of a vehicle by means of ultrasonic sensors is known, for example in order to capture the distance from other objects during parking.

Based on the transit time of the ultrasonic signal, ultrasonic sensors supply distance information, but not height information of the detected object.

Height information can be established by utilizing further sensors, for example, cameras.

The disadvantage of establishing height information by means of further sensors is that additional hardware is required for this, which increases the technical outlay. In addition, the information provided by different sensors must be combined or fused in order to obtain the height information. This requires additional computing capacity and therefore increases, in turn, the technical outlay.

SUMMARY

Proceeding herefrom, it is the object of the present disclosure to specify a method for classifying heights of objects in the region surrounding vehicles by means of ultrasonic sensor technology, which requires little hardware outlay and therefore saves costs.

The object is addressed by a method having the features of the independent claim 1. Example embodiments are the subject-matter of the subclaims. A system for classifying the heights of objects is the subject-matter of the alternative, independent claim 10 and a vehicle having such a system is the subject-matter of the alternative, claim 15.

According to a first aspect, the present disclosure relates to a method for classifying the height of an object by means of an ultrasonic sensor which is provided on a vehicle. The method comprises the following steps.

An ultrasonic signal is initially emitted by the vehicle's ultrasonic sensor in a transmission cycle. The ultrasonic sensor has a certain reception range. This indicates the distance up to which objects can be detected by the ultrasonic sensor.

After the transmission cycle, a reception cycle is performed, in which reflected signal components of the ultrasonic signal are received. The reception cycle has a reception time window which makes it possible to receive echoes having a transit time which corresponds to at least double the reception range of the ultrasonic sensor. Therefore, echoes which originate from multiple reflections between the object and the sensor can also be detected.

Subsequently, in particular following the end of the reception cycle, it is checked whether at least a first and a second echo were received in the reception cycle, wherein the transit time of the second echo corresponds to an integer multiple of the transit time of the first echo. If a second echo is identified, the transit time of which is an integer multiple of the transit time of the first echo, this is an indication that the second echo has passed through the distance between the sensor and the object at least a second time due to a multiple reflection. Moreover, it can be checked whether the second echo has a lower signal amplitude than the first echo, in particular the signal amplitude of the second echo is more than 50% lower than the signal amplitude of the first echo. This would be a further indication that the second echo can be attributed to a multiple reflection.

Finally, a detected object is classified in a height class depending on whether at least a first and a second echo were received, wherein the transit time of the second echo is an integer multiple of the transit time of the first echo. The classification rule draws on the knowledge that objects which have at least a height which is equal to or greater than the height at which the sensor is arranged on the vehicle can lead to multiple reflections, whereas lower objects do not cause multiple reflections due to the oblique direction of propagation of the ultrasonic signal.

The technical advantage of the method according to the present disclosure is that it becomes possible to classify the heights of objects based solely on information which is provided by the ultrasonic sensor, which significantly reduces the outlay for classifying the heights of objects.

According to one example embodiment, an object is classified as a high object if a second echo was identified, the transit time of which corresponds to an integer multiple of the transit time of the first echo, wherein a high object has at least a height equal to the vertically measured height at which the ultrasonic sensor is provided on the vehicle. Such high objects make possible multiple reflections between the sensor or vehicle and the object, which preferably take place substantially in a horizontal plane. If multiple reflections exist, it can therefore be assumed that the object has at least a height which corresponds to the sensor height.

According to one example embodiment, an object is classified as a low object if no second echo was identified, the transit time of which corresponds to an integer multiple of the transit time of the first echo, wherein a low object has a height smaller than the vertically measured height at which the ultrasonic sensor is provided on the vehicle. The classification rule makes use of the fact that an object which does not produce multiple reflections will, as a rule, be lower than the sensor height, since the reflected signal component of the ultrasonic signal strikes the sensor obliquely from below and is reflected obliquely upward when it is reflected again.

According to one example embodiment, an object is classified as a high object if at least a second echo was identified, the transit time of which corresponds to an integer multiple of the transit time of the first echo, wherein a high object has a height equal to or greater than the vertically measured height at which the ultrasonic sensor is provided on the vehicle, and the distance of the object from the sensor is smaller than 2 m, in particular 1.5 m or smaller. As a result, a double reflection can be captured without enlarging the time span of the reception cycle.

According to one example embodiment, in the event that at least three echoes are received in the reception cycle, wherein the transit time of the second echo is an integer multiple of the first echo and the third echo has a transit time which is not a common multiple of the transit time of the first echo, two objects are detected, wherein a first object which is assigned to the first and second echo is classified as a high object and a second object which is assigned to the third echo is classified as a low object. If, of course, one object leads to a multiple reflection and a further one does not, the object which does not produce a multiple reflection must be located in front of the further object and must be lower, otherwise it would be shaded. This applies in any case when the objects are arranged in the same or substantially the same radial direction, i.e., at the same or substantially the same azimuth angle with respect to the ultrasonic sensor.

According to one example embodiment, in the case of the previously described example embodiment, it is additionally checked whether the first and second object have the same azimuth angle with respect to the ultrasonic sensor. This can, for example, be effected by trilateration, by determining the Doppler frequency shift by virtue of the radial speed component of the vehicle relative to the object and/or by tracking the captured object over a certain period of time (for example, by a Kalman filter).

According to one example embodiment, the vehicle has a computing unit which, in addition to the previously described height classification method as the first method, provides at least one further, second method for classifying heights. The height of the object is classified based on a weighted combination of the classification results of the first and second method. This can increase the reliability of the height classification. It is understood that results of more than two height classification methods can also be combined with one another in order to obtain an overall classification result based on a weighted combination of the classification results.

According to one example embodiment, a machine learning method is used in order to establish weighting factors and/or to modify these after they have been established in order to carry out the weighted combination of the classification results of the first and second method, based on the weighting factors. A neural network is trained based on training data so that after the training phase a weighted combination of the classification results is effected, based on statistical relationships which were identified in the training phase.

According to one example embodiment, a machine learning method is used in order to obtain a height classification result based on several different pieces of input information. The input information can be, for example:
- the number of multiple reflections which are assigned to an emitted ultrasonic signal;
- the amplitude of the received echo(es);
- features which are obtained by tracking the echoes, for example, Kalman gain; average of the amplitude variance; distance variance, etc.
- taking into account the fact that other objects are in front of the captured object; and
- current capturing scenario.

Such input information can be captured in a plurality of scenarios and can be used to train the neural network.

According to one example embodiment, a capturing scenario is initially determined depending on the current driving situation. On the basis of the established capturing scenario, at least one further height classification method is selected, based on which a height classification is possible in said established capturing scenario. Consequently, it is possible to select the further height classification method as a function of the respective identified capturing scenario. The capturing scenario can, for example, indicate whether the direction of travel runs parallel or perpendicular to a detected object.

According to one example embodiment, based on probability values which indicate the probability that the current driving situation of the vehicle is to be assigned to a determined capturing scenario, a probability is calculated that an object is to be classed in a determined height category and, indeed, based on a sum of conditional probability values, wherein the conditional probability values each indicate how high the probability is that an object is to be classed in a determined height category on the condition that a determined capturing scenario exists. As a result, errors or inaccuracies in the height classification, which arise due to an incorrect assignment of the driving scenario to a determined driving situation, can be effectively avoided or at least reduced.

According to a further aspect, the present disclosure relates to a system for classifying the height of an object. The system comprises at least one ultrasonic sensor and a computing unit which is configured to evaluate the information provided by the ultrasonic sensor. The system is configured to execute the following steps:
a) Emitting an ultrasonic signal by the ultrasonic sensor of the vehicle in a transmission cycle;
b) Performing a reception cycle, wherein the reception cycle has a reception time window which makes it possible to receive echoes having a transit time which corresponds to at least double the reception range of the ultrasonic sensor;
c) Checking whether at least a first and a second echo were received in the reception cycle, wherein the transit time of the second echo corresponds to an integer multiple of the transit time of the first echo; and
d) Classifying a detected object in a height class depending on whether at least a first and a second echo were received, wherein the transit time of the second echo is an integer multiple of the transit time of the first echo.

The technical advantage of the system according to the present disclosure is that it becomes possible to classify the heights of objects based solely on information which is provided by the ultrasonic sensor, which significantly reduces the outlay for classifying the heights of objects.

According to one example embodiment of the system, the computing unit is configured to classify an object as a high object if a second echo was identified, the transit time of which corresponds to an integer multiple of the transit time of the first echo, wherein a high object has at least a height equal to the vertically measured height at which the ultrasonic sensor is provided on the vehicle. Such high objects make possible multiple reflections between the sensor or vehicle and the object, which may take place substantially in a horizontal plane. If multiple reflections exist, it can therefore be assumed that the object has at least a height which corresponds to the sensor height.

According to one example embodiment of the system, the computing unit is configured to classify an object as a low object if no second echo was identified, the transit time of which corresponds to an integer multiple of the transit time of the first echo, wherein a low object has a height smaller than the vertically measured height at which the ultrasonic sensor is provided on the vehicle. The classification rule makes use of the fact that an object which does not produce multiple reflections will, as a rule, be lower than the sensor height, since the reflected signal component strikes the sensor obliquely from below and is reflected obliquely upward when it is reflected again.

According to one example embodiment of the system, the computing unit is configured to detect two objects, in the event that at least three echoes are received in the reception cycle, wherein the transit time of the second echo is an integer multiple of the first echo and the third echo has a transit time which is not a common multiple of the transit time of the first echo, wherein a first object which is assigned to the first and second echo is classified as a high object and a second object which is assigned to the third echo is classified as a low object. If, of course, one object leads to a multiple reflection and a further one does not, the object which does not produce a multiple reflection must be located in front of the further object and must be lower, otherwise it would be shaded. This applies in any case when the objects are arranged in the same or substantially the same radial direction, i.e., at the same or substantially the same azimuth angle with respect to the ultrasonic sensor.

According to one example embodiment of the system, the computing unit is configured to additionally verify whether the first and second object have the same azimuth angle with respect to the ultrasonic sensor.

According to yet another aspect, the present disclosure relates to a vehicle having a system for classifying the heights of objects according to one of the previously described example embodiments.

Within the meaning of the invention, the expressions "approximately", "substantially" or "roughly" mean deviations from the exact value in each case by +/−10%, preferably by +/−5% and/or deviations in the form of changes which are not significant for the function.

Further developments, advantages and possible applications of the present disclosure are also set out in the following description of example embodiments and the figures. All of the features described and/or illustrated are, in principle, the subject-matter of the invention, either individually or in any combination, regardless of how they are summarized in the claims or how they relate back to them. The content of the claims is also made part of the description.

BRIEF DESCRIPTION OF THE DRAWINGS

The invention is explained in more detail below with reference to the figures of exemplary embodiments, wherein.

DETAILED DESCRIPTION

Figure 1:
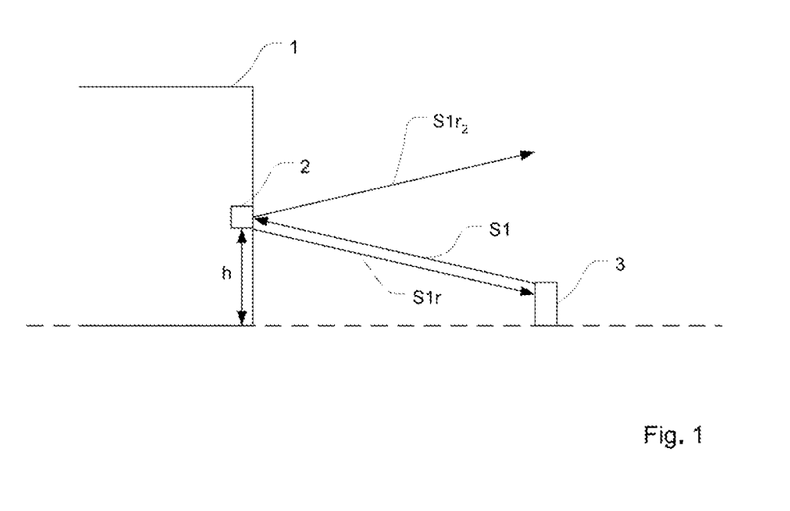
FIG. 1 shows, by way of example and schematically, a vehicle having an ultrasonic sensor and the propagation of the ultrasonic signals which result from a reflection by a detected, low object and a further reflection in the region of the sensor or the vehicle.

FIG. 1 shows, by way of example, a capturing situation, in which an object 3 is captured by means of an ultrasonic sensor 2 of a vehicle 1, which object is lower than the height h of the ultrasonic sensor 2. The height h is, for example, measured as the distance of the center of the ultrasonic sensor 2 from the height of the roadway.

As is obvious in FIG. 1, an ultrasonic signal S1 is emitted obliquely downward onto the low object 3, is reflected there and reflected back to the ultrasonic sensor 2. Said ultrasonic signal component $S1r$, which is reflected back, is reflected again by the ultrasonic sensor 2 and reflected back obliquely upward as a twice reflected ultrasonic signal component $S1r_2$. Therefore, the twice reflected ultrasonic signal component $S1r_2$ no longer strikes the object 3.

Figure 2:
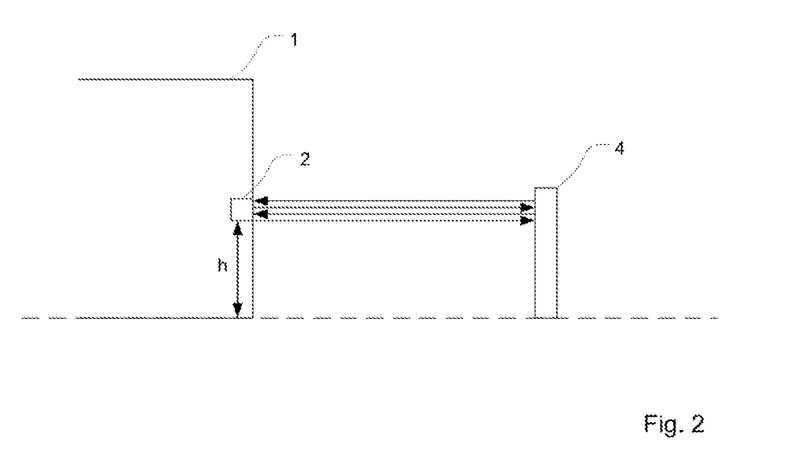
FIG. 2 shows, by way of example and schematically, a vehicle having an ultrasonic sensor and the propagation of the ultrasonic signals which result from a reflection by a detected, high object and a multiple reflection by the sensor or the vehicle.

FIG. 2 shows a further capturing situation, in which an object 4 is captured by means of an ultrasonic sensor 2 of a vehicle 1, which object is at least the same height or higher than the ultrasonic sensor 2. In this case, it is possible that multiple reflections occur between the ultrasonic sensor 2 and the object 4, as indicated by the arrows in FIG. 2. An ultrasonic signal S1 emitted by the ultrasonic sensor 2 is reflected by the object 4 and strikes the ultrasonic sensor 2 again in such a way that it is reflected again toward the object 4. As a result, multiple reflections are created between the ultrasonic sensor 2 and the object 4, which are characterized by a decreasing signal amplitude. However, the multiple reflections are characterized in that they each have a multiple of the propagation path of the reflected-back ultrasonic signal component $S1r$ so that it is guaranteed that the multiple reflection can be clearly identified therewith.

According to the present disclosure, the time span in which reflected signal components can be received after a transmission cycle is selected in such a way that such multiple reflections can also be detected. In particular, this means that the time span of the reception cycle is dimensioned to be at least large enough that reflected signal components can be received, which have covered a propagation path which corresponds to four times the reception radius of the ultrasonic sensor 2.

In order to classify the heights of objects, it is checked according to the present disclosure whether several echoes of the ultrasonic signal were received in the reception cycle, the propagation times of which are integer multiples. If at least a first and a second echo were received, wherein the transit time of the second echo is an integer multiple of the first echo, the object can be classified as a high object 4, i.e., it has at least a height equal to the height h of the ultrasonic sensor 2. If no multiple reflections having transit times as integer multiples were identified, this allows the conclusion that the reflection was effected by a low object 3.

In addition, it is checked whether the second echo has a smaller signal amplitude than the first echo. As a result, it can be checked, in addition, whether the second echo is the result of a multiple reflection, since multiple reflections lead to a weakening of the signal amplitude.

Figure 3:
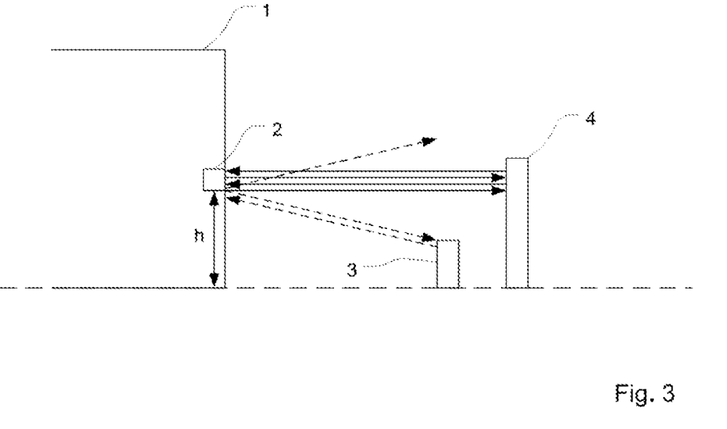
FIG. 3 shows, by way of example and schematically, a vehicle having an ultrasonic sensor and the propagation of the ultrasonic signals which result from reflections by a detected, low object and a detected, high object.

FIG. 3 shows a capturing situation, in which both a low object 3 and a high object 4 are captured by the ultrasonic sensor 2, wherein the low object 3, viewed in the radial direction of the ultrasonic sensor 2, lies between the high object 4 and the ultrasonic sensor 2.

The vehicle 1 can have a computing unit which is configured to determine the azimuth angle of a detected object relative to the vehicle 1. The azimuth angle can be determined, for example, by means of several ultrasonic sensors by trilateration, by determining the Doppler frequency shift by virtue of the radial speed component of the vehicle 1 and/or by tracking the captured object over a certain period of time.

The computing unit of the vehicle, which provides environmental information based on the information of the at least one ultrasonic sensor 2, can be designed to verify whether in the case of at least two objects 3, 4, which are arranged in the same radial direction with respect to the ultrasonic sensor 2, at least three ultrasonic echoes can be established in the reception cycle, wherein a second ultrasonic echo has a transit time which is an integer multiple of the transit time of the first echo and the third ultrasonic echo is a single echo, i.e., there are no further echoes which have a transit time which is an integer multiple of the transit time of the third ultrasonic echo.

It can be concluded from the fact that the object 4 produces a multiple reflection, but object 3 does not, and that the objects 3, 4 lie in the same radial direction in relation to the ultrasonic sensor 2, that the object 3 is a low object and the object 4 is a high object.

It is additionally possible to improve the height classification by combining several methods for classifying the heights of objects with one another in order to achieve a better classification accuracy by combining information from different height classification methods.

Several methods can be combined in different ways:

For example, height classification results can be calculated by different height classification methods and then combined into an overall result utilizing weighting factors. For example, weighting factors which depend on the variance of the estimation accuracy of the respective height classification method can be used. Thus, for example, the height classification method having a small estimation accuracy variance can be weighted higher, and vice versa.

Alternatively, the weighting factors can be selected based on information regarding the accuracy or the robustness of the respective methods. In this case, the weighting factors of that method which has a high estimation accuracy or robustness can be selected to be higher.

In the event that no information exists regarding the estimation accuracy or robustness, the weighting factors can be chosen to be the same, so that the different height classification methods are included in the overall result with equal weighting.

In one example embodiment, according to Bayes' theorem, a current classification probability is established by information established in the past and associated probabilities. In particular, different height classification methods provide probabilities which indicate the probability with which a determined object is assigned to a height class. Several probabilities established at different points in time, i.e., probabilities from different transmission/reception cycles, can also be combined with one another.

In addition, machine learning methods can be used in order to combine several different height classification methods into an overall result. Thus, a neural network can be trained, for example, with height estimates from different methods in order to subsequently establish a classification result based on the trained neural network based on the results of the different height classification methods.

In addition, it can be advantageous to carry out the combination of different height classification methods depending on the respective driving situation. Thus, it can be advantageous, for example, to use other height classification methods, in the case of a perpendicular parking situation, than in the case of a driving situation in which the vehicle laterally drives past objects (so-called object scanning). However, it is a prerequisite of the suitable selection of height classification methods depending on the respective driving situation that the driving situation has been correctly identified.

Since the identification of the driving situation can be subject to errors, it can be advantageous to also use information regarding the error probability that the driving situation was incorrectly identified, in addition to the information about which driving situation currently exists, during the height classification.

The procedure for this can be follows.

All of the known scenarios are initially applied to the current driving situation. This means that in the case of the current driving situation, several height classification methods are performed in each case, based on different scenarios, and the results thereof are combined to generate overall results. As a result, several height classification results are obtained for the current driving situation and, indeed, one height classification result per scenario in each case. In this case, the height classification result indicates, for example, a probability that the detected object is to be assigned to a determined height class.

The height classification result of each scenario obtained in the previous step is subsequently linked to the probability that the current driving situation corresponds to the scenario. This results in the probability that a determined object can be assigned to a determined height classification (e.g., high) from the following relationship:

$$p(hoch)=p(hoch,Sz.1)+p(hoch,Sz.2)+ \ldots +p(hoch,Sz.n)$$

where:
p(hoch): means the probability that the identified object is high;
p(hoch,Sz.n): means the probability that the identified object is high, in the case of scenario n, wherein n=1, 2, . . .

This is equivalent to:

$$p(hoch)=p(hoch|Sz.1)*p(Sz.1)+p(hoch|Sz.2)*p(Sz.2)++p(hoch|Sz.n)*p(Sz.n)$$

where:
p(hoch): means the probability that the identified object is high;
p(hoch|Sz.n): means the probability that the identified object is high on the condition that scenario n exists, wherein n=1, 2, . . . ; and
p(Sz.n): means the probability that the driving situation corresponds to scenario n.

Here as well, a machine learning method can be used in order to carry out the height classification based thereon. Thus, a neural network can be used, for example, wherein the probabilities that the current driving situation corresponds to determined scenarios are used as input variables for the neural network, and information is provided as an output variable, which indicates the height category in which an identified object is to be classed.

Figure 4:
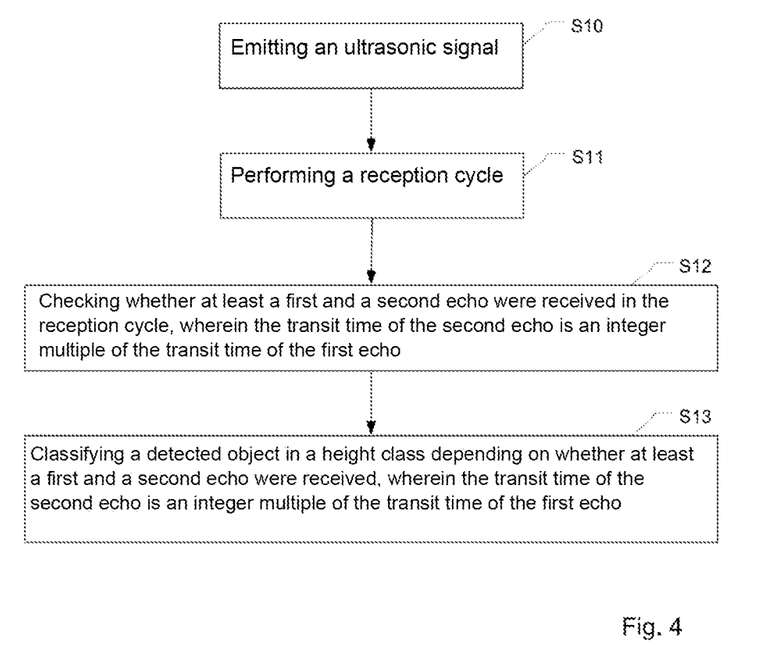
FIG. 4 shows, by way of example, a flowchart which illustrates the steps of a method for classifying the height of an object.

FIG. 4 shows a schematic representation of the steps of a method according to the present disclosure for classifying the height of an object.

An ultrasonic signal is initially emitted by an ultrasonic sensor 2 of the vehicle 1 in a transmission cycle (S10).

Subsequently, a reception cycle is performed. The reception cycle has a reception time window which makes it possible to receive echoes having a transit time which corresponds to at least double the reception range of the ultrasonic sensor 2 (S11).

Thereafter, it is checked whether at least a first and a second echo were received in the reception cycle, wherein the transit time of the second echo corresponds to an integer multiple of the transit time of the first echo (S12).

A detected object is classified in a height class depending on whether at least a first and a second echo were received, wherein the transit time of the second echo is an integer multiple of the transit time of the first echo (S13).

The invention has been described above using exemplary embodiments. It is understood that numerous changes as well as modifications are possible, without departing from the scope of protection defined by the claims.

LIST OF REFERENCE NUMERALS

1 Vehicle
2 Ultrasonic sensor
3 Low object
4 High object
h Height

The invention claimed is:

1. A method for classifying the height of an object by means of at least one ultrasonic sensor of a vehicle, comprising the following steps:
   emitting an ultrasonic signal by the ultrasonic sensor of the vehicle in a transmission cycle;
   performing a reception cycle, wherein the reception cycle has a reception time window which makes it possible to receive echoes having a transit time which corresponds to at least double a reception range of the ultrasonic sensor;
   checking whether at least a first and a second echo were received in the reception cycle, wherein the transit time of the second echo corresponds to an integer multiple of the transit time of the first echo;
   classifying a detected object in a height class depending on whether at least a first and a second echo were received, wherein the transit time of the second echo is an integer multiple of the transit time of the first echo, wherein one of
   (a) the vehicle has a computer which, in addition to the height class tion method as a first method, provides at least one further, second method for classifying heights, and the height according to the second method is classified based on a weighted combination of classification results of the first meth the seco method, or
   (b) based on probability values which indicate a probability that a current driving situation of the vehicle is to be assigned to a determined capturing scenario, a probability is calculated that an object is to be classed in a determined height and, based on a sum of conditional ability values, wherein the conditional probability values each indicates how high the probability is that the object is to be classed in a determined height category on a condition that a determined capturing scenario exists.

2. The method according to claim 1, wherein an object is classified as a high object if a second echo was identified, the transit time of which corresponds to an integer multiple of the transit time of the first echo, wherein a high object has at least a height equal to a vertically measured height at which the ultrasonic sensor is provided on the vehicle.

3. The method according to claim 1, wherein an object is classified as a low object if no second echo was identified, the transit time of which corresponds to an integer multiple of the transit time of the first echo, wherein a low object has a height smaller than the vertically measured height at which the ultrasonic sensor is provided on the vehicle.

4. The method according to claim 1, wherein, in the event that at least three echoes are received in the reception cycle, wherein the transit time of the second echo is an integer multiple of the first echo and the third echo has a transit time which is not a common multiple of the transit time of the first echo, two objects are detected, wherein a first object which is assigned to the first and second echo is classified as a high object and a second object which is assigned to the third echo is classified as a low object.

5. The method according to claim 4, further comprising checking whether the first and second object have the same azimuth angle with respect to the ultrasonic sensor.

6. The method according to claim 1, wherein the one of (a) or (b) is (a).

7. The method according to claim 6, wherein a machine learning method is used in order to at least one of establish weighting factors or modify the weighting factors after the weighting factors have been established in order to carry out the weighted combination of the classification results of the first and second method, based on the weighting factors.

8. The method according to claim 6, further comprising initially determining a capturing scenario depending on a current driving situation and, based on the established capturing scenario, selecting at least one further height classification method based on which a height classification is possible in the established capturing scenario.

9. The method according to claim 1, wherein the one of (a) or (b) is (b).

10. A system for classifying a height of an object, comprising at least one ultrasonic sensor and a computer unit which is configured to evaluate the information provided by the ultrasonic sensor, wherein the system is configured to execute the following:
    emitting an ultrasonic signal by the ultrasonic sensor of a vehicle in a transmission cycle;
    performing a reception cycle, wherein the reception cycle has a reception time window which makes it possible to receive echoes having a transit time which corresponds to at least double the reception range of the ultrasonic sensor;
    checking whether at least a first and a second echo were received in the reception cycle, wherein the transit time of the second echo corresponds to an integer multiple of the transit time of the first echo; and
    classifying a detected object in a height class depending on whether at least a first and a second echo were received, wherein the transit time of the second echo is an integer multiple of the transit time of the first echo, wherein one of
    (a) the vehicle has a computer which, in addition to the height classification method as a first method, provides at least one further, second method for classifying heights, and the height according to the second method is classified based on a weighted combination of classification results of the first method and the second method, or
    (b) based on probability values which in rate a probability bat a current driving situation of the vehicle is to be assigned to a determined capturing scenario, a probability is calculated that an object is to be classed in a determined height category and, based on a sum of conditional probability values, wherein the conditional probability each indicates how high the probability is that the object is to be classed in a determined height category on a condition that a determined capturing scenario exists.

11. The system according to claim 10, wherein the computer unit is configured to classify an object as a high object if a second echo was identified, the transit time of which corresponds to an integer multiple of the transit time of the first echo, wherein a high object has at least a height equal to a vertically measured height at which the ultrasonic sensor is provided on the vehicle.

12. The system according to claim 10, wherein the computer unit is configured to classify an object as a low object if no second echo was identified, the transit time of which corresponds to an integer multiple of the transit time of the first echo, wherein a low object has a height smaller than a vertically measured height at which the ultrasonic sensor is provided on the vehicle.

13. The system according to claim 10, wherein the computer unit is configured to detect two objects, in the event that at least three echoes are received in the reception cycle, wherein the transit time of the second echo is an integer multiple of the first echo and the third echo has a transit time which is not a common multiple of the transit time of the first echo, wherein a first object which is assigned to the first and second echo is classified as a high object and a second object which is assigned to the third echo is classified as a low object.

14. The system according to claim 13, wherein the computer unit is configured to additionally verify whether the first and second object have the same azimuth angle with respect to the ultrasonic sensor.

15. A vehicle comprising a system according to claim 10.

16. The system according to claim 10, wherein a machine learning method is used in order to at least one of establish weighting factors or modify the weighting factors after the weighting factors have been established in order to carry out the weighted combination of the classification results of the first and second method, based on the weighting factors.

17. The system according to claim 10, further comprising initially determining a capturing scenario depending on a current driving situation and, based on the established capturing scenario, selecting at least one further height classification method based on which a height classification is possible in the established capturing scenario.

18. The system according to claim 10, wherein the one of (a) or (b) is (b).

19. The system according to claim 10, wherein the one of (a) or (b) is (a).

* * * * *